United States Patent
Wagoner et al.

(10) Patent No.: US 10,468,881 B2
(45) Date of Patent: Nov. 5, 2019

(54) ELECTRICAL POWER SYSTEMS HAVING ZIG-ZAG TRANSFORMERS

(71) Applicant: General Electric Company, Schenectady, NY (US)

(72) Inventors: Robert Gregory Wagoner, Roanoke, VA (US); David Smith, Daleville, VA (US); Govardhan Ganireddy, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 18 days.

(21) Appl. No.: 15/609,458

(22) Filed: May 31, 2017

(65) Prior Publication Data

US 2018/0351358 A1    Dec. 6, 2018

(51) Int. Cl.
  *H02J 3/01*    (2006.01)
  *H02M 1/12*    (2006.01)
  (Continued)

(52) U.S. Cl.
  CPC ............... *H02J 3/01* (2013.01); *H02J 3/386* (2013.01); *H02M 1/12* (2013.01); *H02M 5/12* (2013.01); *H02M 5/44* (2013.01)

(58) Field of Classification Search
  CPC .. H01F 30/12; H01F 30/16; H02J 3/38; H02J 13/00; G03G 15/80; F03D 9/00;
  (Continued)

(56) References Cited

U.S. PATENT DOCUMENTS

| | | |
|---|---|---|
| 8,659,178 B2 | 2/2014 | Arlaban Gabeiras et al. |
| 9,587,626 B2 | 3/2017 | Sadaba et al. |

(Continued)

FOREIGN PATENT DOCUMENTS

DE    10 2006 008 014 A1    8/2007

OTHER PUBLICATIONS

Baron et al., Breaking the 34.5kV Standard, Drawing on hydro experience, Acciona extols use of 12kV collection system to lower energy costs through elimination of step-up transformers, Wind Systems Magazine, Apr. 2013, pp. 48-54.
(Continued)

*Primary Examiner* — Fritz M Fleming
*Assistant Examiner* — Jagdeep S Dhillon
(74) *Attorney, Agent, or Firm* — Dority & Manning, P.A.

(57) ABSTRACT

An electrical power system connectable to a power grid includes a plurality of electrical power subsystems, each of the plurality of electrical power subsystems including a power converter electrically coupled to a generator having a generator rotor and a generator stator. The electrical power system further includes an intermediate power path extending from each of the plurality of electrical power subsystems for providing power from each of the plurality of electrical power subsystems to the power grid. The electrical power system further includes a zig-zag transformer electrically coupling each of the plurality of intermediate power paths to the power grid, the zig-zag transformer including a primary winding and a plurality of secondary windings, each of the plurality of secondary windings connected to one of the plurality of intermediate power paths, and wherein at least one of the plurality of secondary windings is a zig-zag winding.

20 Claims, 10 Drawing Sheets

(51) Int. Cl.
*H02M 5/12* (2006.01)
*H02M 5/44* (2006.01)
*H02J 3/38* (2006.01)

(58) Field of Classification Search
CPC . F03D 9/003; F03D 9/25; F03D 9/257; F03D 9/255; F03D 9/006; F03D 7/02; F03D 7/04; F03D 7/042; F03D 7/0276; H02P 9/00; H02P 9/007; H02P 31/00; H02K 7/18; H02K 7/183; H02K 5/132; H02H 3/10
USPC .................................. 307/83, 66, 64, 43, 80
See application file for complete search history.

(56) References Cited

U.S. PATENT DOCUMENTS

| | | | |
|---|---|---|---|
| 10,072,633 B2* | 9/2018 | Brogan | F03D 7/0276 |
| 2003/0227172 A1 | 12/2003 | Erdman et al. | |
| 2011/0140432 A1* | 6/2011 | Acedo Sanchez | H02P 9/006 |
| | | | 290/44 |
| 2012/0176237 A1 | 7/2012 | Tabe | |
| 2014/0265587 A1* | 9/2014 | Garces | H02M 7/497 |
| | | | 307/52 |
| 2016/0276829 A1 | 9/2016 | Haederli et al. | |
| 2016/0308368 A1* | 10/2016 | Letas | H02J 3/12 |
| 2016/0333856 A1* | 11/2016 | Zabalza | H02H 7/06 |
| 2016/0365727 A1* | 12/2016 | Kam | H02H 7/28 |
| 2017/0009738 A1* | 1/2017 | Brogan | F03D 7/0276 |
| 2017/0324273 A1* | 11/2017 | Hadler-Jacobsen | H02J 13/00 |
| 2018/0302011 A1* | 10/2018 | Ganireddy | H02P 9/007 |

OTHER PUBLICATIONS

Olonso Sadaba et al., Wind Generation Control Strategies for Grid Integration Acciona Windpower Experience, ResearchGate, Acciona Windpower, S.A., uploaded 2015, 11 Pages. https://www.researchgate.net/publication/267966410.

Extended European Search Report issued in connection with corresponding EP Application No. 18173443.5 dated Aug. 14, 2018.

* cited by examiner ized power systems for providing power to a power grid from, for example, wind turbines.

ELECTRICAL POWER SYSTEMS HAVING ZIG-ZAG TRANSFORMERS

FIELD OF THE INVENTION

The present disclosure relates generally to electrical power systems for providing power to a power grid from, for example, wind turbines.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

For example, FIG. 1 illustrates a wind turbine 10. As shown, the wind turbine 10 includes a nacelle 14 that typically houses a generator. The nacelle 14 is mounted on a tower 12 extending from a support surface (not shown). The wind turbine 10 also includes a rotor 16 that includes a plurality of rotor blades 20 attached to a rotating hub 18. As wind impacts the rotor blades 20, the blades 20 transform wind energy into a mechanical rotational torque that rotatably drives a low-speed shaft 22 (FIG. 2). The low-speed shaft 22 is configured to drive a gearbox 24 (FIG. 2) (where present) that subsequently steps up the low rotational speed of the low-speed shaft 22 to drive a high-speed shaft 26 (FIG. 2) at an increased rotational speed.

The shaft 22 or 26 may be rotatably coupled to a generator of an electrical power system. In some embodiments, for example, the generator is a doubly-fed induction generator or DFIG. In other embodiments, the electrical power system is a full conversion system only coupled to the stator of the generator. In either case, the electrical power system provides the power generated by the wind turbine 10 to the power grid as electrical power in a suitable form for use in the power grid.

One issue that needs to be addressed in power systems is harmonics. Power generation systems connected to a utility grid must meet certain agency requirements for harmonics. Accordingly, power systems which include features for reducing the harmonic currents being injected into the power grid, particularly in view of agency harmonics requirements, would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, an electrical power system connectable to a power grid is provided. The electrical power system includes a plurality of electrical power subsystems, each of the plurality of electrical power subsystems including a power converter electrically coupled to a generator having a generator rotor and a generator stator. The electrical power system further includes an intermediate power path extending from each of the plurality of electrical power subsystems for providing power from each of the plurality of electrical power subsystems to the power grid. The electrical power system further includes a zig-zag transformer electrically coupling each of the plurality of intermediate power paths to the power grid, the zig-zag transformer including a primary winding and a plurality of secondary windings, each of the plurality of secondary windings connected to one of the plurality of intermediate power paths, and wherein at least one of the plurality of secondary windings is a zig-zag winding.

In accordance with another embodiment, an electrical power system connectable to a power grid is provided. The electrical power system includes a plurality of electrical power subsystems, each of the plurality of electrical power subsystems including a power converter electrically coupled to a generator having a generator rotor and a generator stator. Each of the plurality of electrical power subsystems defines a stator power path and a converter power path for providing power to the power grid. Each of the plurality of electrical power subsystems further includes a transformer. The electrical power system further includes an intermediate power path extending from each of the plurality of electrical power subsystems for providing power from each of the plurality of electrical power subsystems to the power grid. The electrical power system further includes a zig-zag transformer electrically coupling each of the plurality of intermediate power paths to the power grid, the zig-zag transformer including a primary winding and a plurality of secondary windings, each of the plurality of secondary windings connected to one of the plurality of intermediate power paths, and wherein at least one of the plurality of secondary windings is a zig-zag winding.

In accordance with another embodiment, an electrical power system connectable to a power grid is provided. The electrical power system includes a plurality of electrical power subsystems, each of the plurality of electrical power subsystems including a power converter electrically coupled to a generator having a generator rotor and a generator stator. Each of the plurality of electrical power subsystems defines a generator power path from the stator and the power converter for providing power to the power grid. The electrical power system further includes an intermediate power path extending from each of the plurality of electrical power subsystems for providing power from each of the plurality of electrical power subsystems to the power grid. The electrical power system further includes a zig-zag transformer electrically coupling each of the plurality of intermediate power paths to the power grid, the zig-zag transformer including a primary winding and a plurality of secondary windings, each of the plurality of secondary windings connected to one of the plurality of intermediate power paths, and wherein at least one of the plurality of secondary windings is a zig-zag winding.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
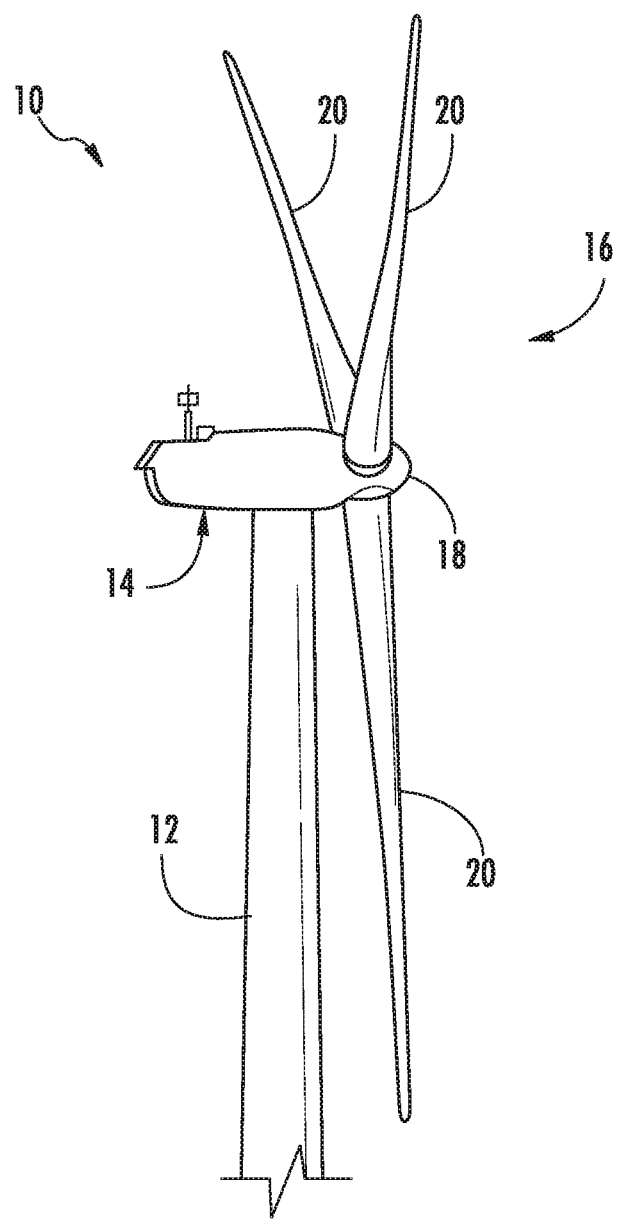
FIG. 1 illustrates a perspective view of a portion of one embodiment of a wind turbine according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
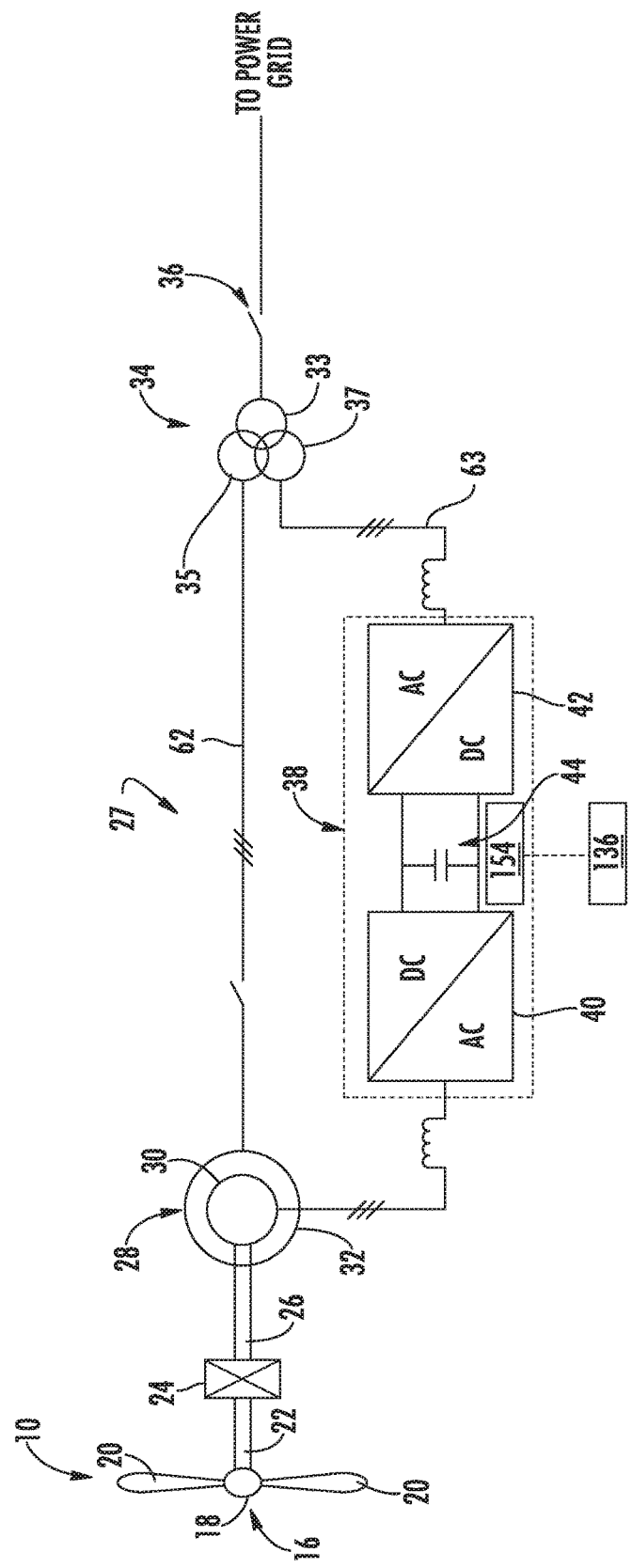
FIG. 2 illustrates a schematic diagram of one embodiment of an electrical power subsystem for use with a wind turbine in accordance with the present disclosure.

FIG. 2 illustrates an electrical power subsystem 27 in accordance with embodiments of the present disclosure. In these embodiments, the high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is typically connected to a power grid via a grid breaker 36. Thus, the main transformer 34 steps up the voltage amplitude of the electrical power such that the transformed electrical power may be further transmitted to the power grid.

In addition, as shown, the generator 28 is typically electrically coupled to a bi-directional power converter 38 that includes a rotor-side converter 40 joined to a line-side converter 42 via a regulated DC link 44. The rotor-side converter 40 converts the AC power provided from the rotor 30 into DC power and provides the DC power to the DC link 44. The line side converter 42 converts the DC power on the DC link 44 into AC output power suitable for the power grid. Thus, the AC power from the power converter 38 can be combined with the power from the stator 32 via a converter power path 63 and stator power path 62 to provide multi-phase power (e.g. three-phase power) having a frequency maintained substantially at the frequency of the power grid (e.g. 50 Hz/60 Hz).

As shown in FIG. 2, the illustrated three-winding transformer 34 typically has (1) a 33 kilovolt (kV) medium voltage (MV) primary winding 33 connected to the power grid, (2) a 6 to 13.8 kV MV secondary winding 35 connected to the generator stator 32 via stator power path 62, and (3) a 690 to 900 volt (V) low-voltage (LV) tertiary winding 37 connected to the line-side power converter 42 via the converter power path 63.

Figure 3:
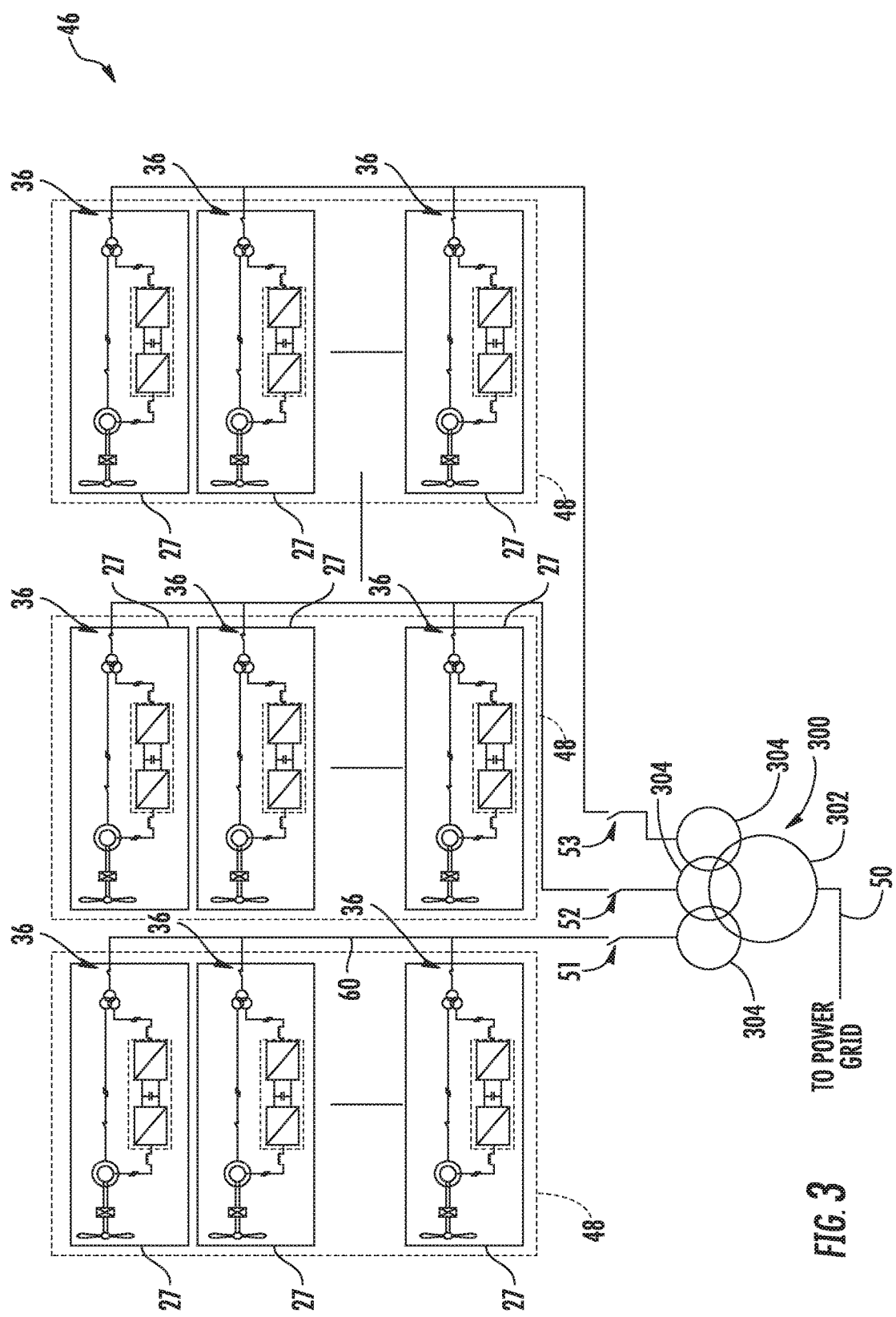
FIG. 3 illustrates a schematic diagram of one embodiment of an electrical power system according to the present disclosure, particularly illustrating a plurality of subsystems such as those illustrated in FIG. 2.

Referring now to FIG. 3, individual power subsystems 27 of a plurality of wind turbines 10 may be arranged in a predetermined geological location and electrically connected together to form an electrical power system 46. More specifically, as shown, the wind turbines 10 may be arranged into a plurality of clusters 48 with each cluster separately connected to a transformer 300, such as via switches 51, 52, 53, respectively. Transformer 300 may step up the voltage amplitude of the electrical power from the groups 48 of wind turbines 10 before sending the power to the grid via a main line 50. An intermediate power path 60 may electrically connect the cluster 48 to the transformer 300. The intermediate power path 60 may, for example, extend for each subsystem 27 from the subsystem breaker 36 to the transformer 300, such as via main line 50. It should be understood that each cluster 48 may include one or more subsystems 27, with each intermediate power path 60 electrically coupling one or more subsystems 27 to the transformer 300.

Figure 4:
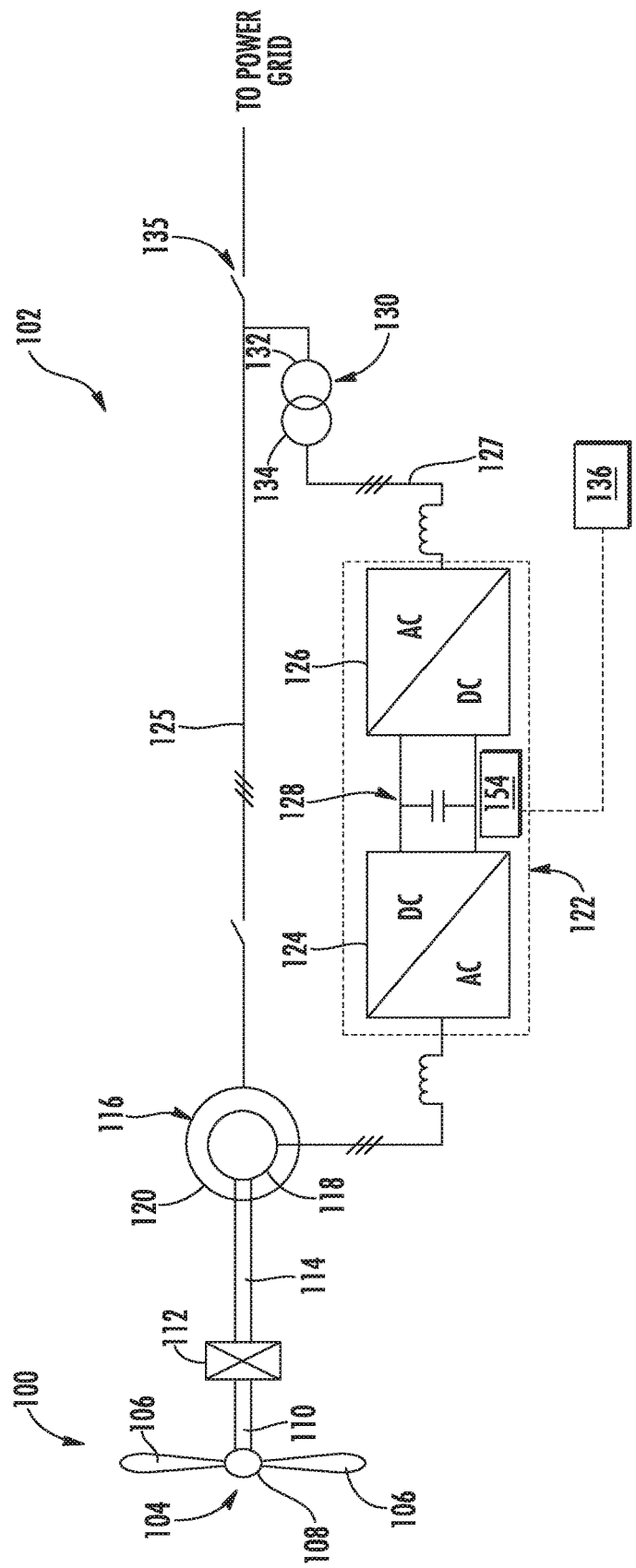
FIG. 4 illustrates a schematic diagram of another embodiment of an electrical power subsystem for use with a wind turbine according to the present disclosure.

Referring now to FIG. 4, a schematic diagram of another embodiment of an electrical power subsystem 102 according to the present disclosure is illustrated. It should be understood that the term "subsystem" is used herein to distinguish between the individual power systems (e.g. as shown in FIG. 4 or FIG. 2) and the overall electrical power system 105 of FIG. 5 or 46 of FIG. 3 that includes a plurality of electrical power subsystems 102 or 27. Those of ordinary skill in the art, however, will recognize that the electrical power subsystem 102 of FIG. 4 (or 27 of FIG. 2) may also be referred to more generically, such as a simply a system (rather than a subsystem). Therefore, such terms may be used interchangeably and are not meant to be limiting.

As shown in FIG. 4, the electrical power subsystem 102 may correspond to a wind turbine power system 100. More specifically, as shown, the wind turbine power system 100 includes a rotor 104 that includes a plurality of rotor blades 106 attached to a rotating hub 108. As wind impacts the rotor blades 106, the blades 106 transform wind energy into a mechanical rotational torque that rotatably drives a low-speed shaft 110. The low-speed shaft 110 is configured to drive a gearbox 112 that subsequently steps up the low rotational speed of the low-speed shaft 110 to drive a high-speed shaft 114 at an increased rotational speed. The high-speed shaft 114 is generally rotatably coupled to a doubly-fed induction generator 116 (referred to hereinafter as DFIG 116) so as to rotatably drive a generator rotor 118. As such, a rotating magnetic field may be induced by the generator rotor 118 and a voltage may be induced within a generator stator 120 that is magnetically coupled to the generator rotor 118. In one embodiment, for example, the generator 116 is configured to convert the rotational mechanical energy to a sinusoidal, three-phase alternating current (AC) electrical energy signal in the generator stator 120. Thus, as shown, the associated electrical power can be transmitted from the generator stator 120 directly the grid.

In addition, as shown in FIG. 4, the generator 116 is electrically coupled to a bi-directional power converter 122 that includes a rotor-side converter 124 joined to a line-side converter 126 via a regulated DC link 128. Thus, the rotor-side converter 124 converts the AC power provided from the generator rotor 118 into DC power and provides the DC power to the DC link 128. The line side converter 126 converts the DC power on the DC link 128 into AC output power suitable for the power grid. More specifically, as shown, the AC power from the power converter 122 can be combined with the power from the generator stator 120 via a converter power path 127 and a stator power path 125, respectively. For example, as shown, and in contrast to the systems illustrated in FIGS. 2-3, the converter power path 127 may include a partial power transformer 130 for stepping up the voltage amplitude of the electrical power from the power converter 122 such that the transformed electrical power may be further transmitted to the power grid. Thus, as shown, the illustrated system 102 of FIG. 4 does not include the three-winding main transformer described above. Rather, as shown in the illustrated embodiment, the partial power transformer 130 may correspond to a two-winding transformer having a primary winding 132 connected to the power grid and a secondary winding 134 connected to the line side converter 126. Notably, the partial power transformer may in some embodiments include a third auxiliary winding for auxiliary loads.

In addition, the electrical power subsystem 102 may include a turbine controller 136 configured to control any of the components of the wind turbine 100 and/or implement the method steps as described herein. For example, as shown particularly in FIG. 6, the turbine controller 136 may include one or more processor(s) 138 and associated memory device(s) 140 configured to perform a variety of computer-implemented functions (e.g., performing the methods, steps, calculations and the like and storing relevant data as disclosed herein). Additionally, the turbine controller 136 may also include a communications module 142 to facilitate communications between the turbine controller 136 and the various components of the wind turbine 100, e.g. any of the components of FIGS. 4 and 5. Further, the communications module 142 may include a sensor interface 144 (e.g., one or more analog-to-digital converters) to permit signals transmitted from one or more sensors 139, 141, 143 to be converted into signals that can be understood and processed by the processors 138. It should be appreciated that the sensors 139, 141, 143 may be communicatively coupled to the communications module 142 using any suitable means. For example, as shown in FIG. 6, the sensors 139, 141, 143 may be coupled to the sensor interface 144 via a wired connection. However, in other embodiments, the sensors 139, 141, 143 may be coupled to the sensor interface 144 via a wireless connection, such as by using any suitable wireless communications protocol known in the art. As such, the processor 138 may be configured to receive one or more signals from the sensors 139, 141, 143.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 138 is also configured to compute advanced control algorithms and communicate to a variety of Ethernet or serial-based protocols (Modbus, OPC, CAN, etc.). Additionally, the memory device(s) 140 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 138, configure the turbine controller 136 to perform the various functions as described herein.

In operation, alternating current (AC) power generated at the generator stator 120 by rotation of the rotor 104 is provided via a dual path to the grid, i.e. via the stator power path 125 and the converter power path 127. More specifically, the rotor side converter 124 converts the AC power provided from the generator rotor 118 into DC power and provides the DC power to the DC link 128. Switching elements (e.g. IGBTs) used in bridge circuits of the rotor side converter 124 can be modulated to convert the AC power provided from the generator rotor 118 into DC power suitable for the DC link 128. The line side converter 126 converts the DC power on the DC link 128 into AC output power suitable for the grid. In particular, switching elements (e.g. IGBTs) used in bridge circuits of the line side converter 126 can be modulated to convert the DC power on the DC link 128 into AC power. As such, the AC power from the power converter 122 can be combined with the power from the generator stator 120 to provide multi-phase power having a frequency maintained substantially at the frequency of the grid. It should be understood that the rotor side converter 124 and the line side converter 126 may have any configuration using any switching devices that facilitate operation of an electrical power system as described herein.

Further, the power converter 122 may be coupled in electronic data communication with the turbine controller 136 and/or a separate or integral converter controller 154 to control the operation of the rotor side converter 124 and the line side converter 126. For example, during operation, the turbine controller 136 may be configured to receive one or more voltage and/or electric current measurement signals from the first set of voltage and electric current sensors 139, 141, 143. Thus, the turbine controller 136 may be configured to monitor and control at least some of the operational variables associated with the wind turbine 100 via the sensors 139, 141, 143. In the illustrated embodiment, the electric current sensors 139, 141, 143 may be electrically coupled to any portion of electrical power subsystem 102 that facilitates operation of electrical power subsystem 102 as described herein.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the converter controller 154 is configured to receive one or more voltage and/or electric current feedback signals from the electric current sensors 139, 141, 143. More specifically, in certain embodiments, the current or voltage feedback signals may include at least one of line feedback signals, line-side converter feedback signals, rotor-side converter feedback signals, or stator feedback signals.

Figure 5:
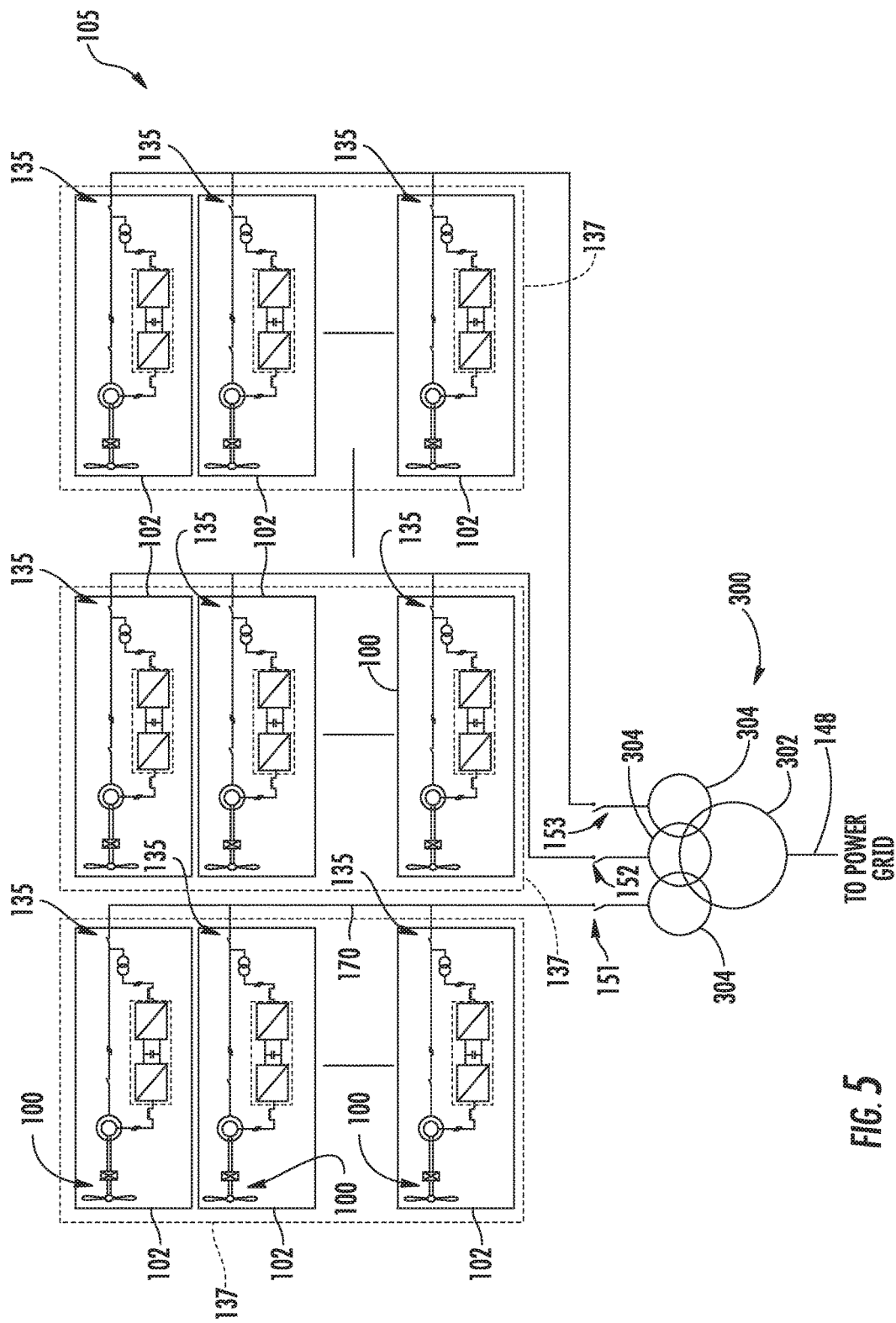
FIG. 5 illustrates a schematic diagram of another embodiment of an electrical power system according to the present disclosure, particularly illustrating a plurality of subsystems such as those illustrated in FIG. 4.
Figure 6:
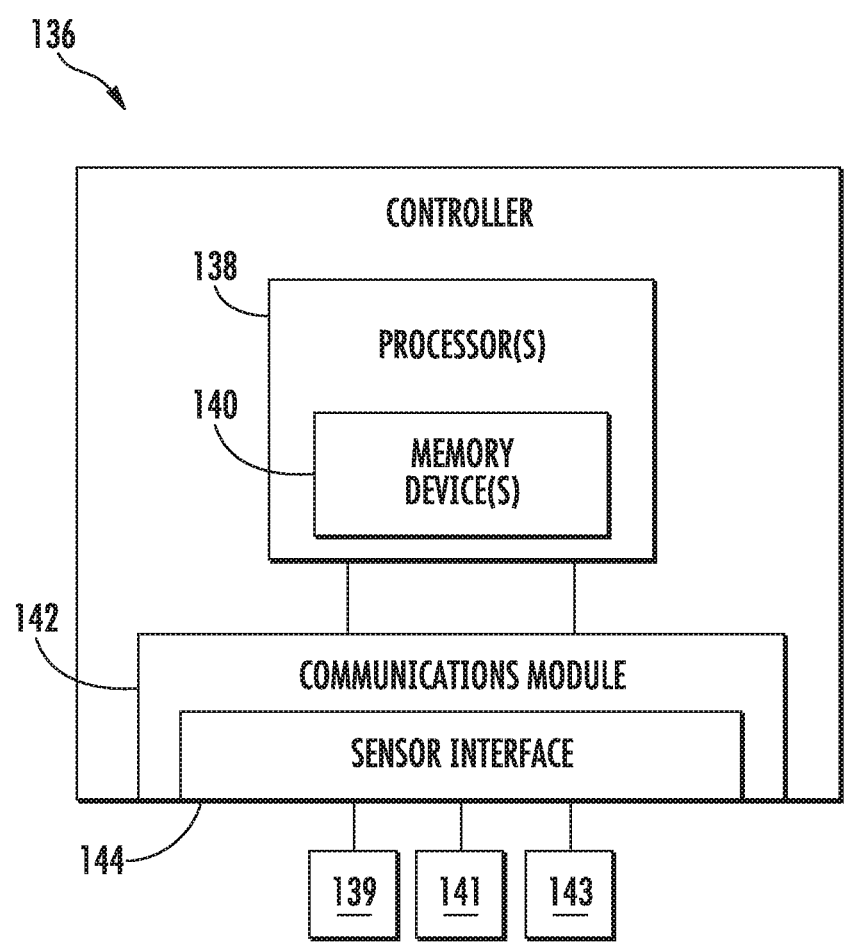
FIG. 6 illustrates a block diagram of one embodiment of a wind turbine controller according to the present disclosure.

Referring particularly to FIG. 5, individual power systems (such as the power subsystem 102 illustrated in FIG. 4) may be arranged in at least two clusters 137 to form an electrical power system 105. More specifically, as shown, the wind turbine power systems 100 may be arranged into a plurality of clusters 137 so as to form a wind farm. Further, each cluster 137 may be connected to a transformer 300, such as via switches 151, for stepping up the voltage amplitude of the electrical power from each cluster 137 such that the transformed electrical power may be further transmitted to the power grid, such as via a main line 148. Each subsystem 102 may be connected to the cluster 137 via a subsystem breaker 135, as shown. An intermediate power path 170 may electrically connect each cluster 137 to the transformer 300. The intermediate power path 170 may, for example, extend for each subsystem 102 from the subsystem breaker 135 to the transformer 300 such as to the winding of the transformer 300 to which the subsystem 102 is connected. It should be understood that each cluster 137 may include one or more subsystems 102, with each intermediate power path 170 electrically coupling one or more subsystems 102 to the transformer 300.

Figure 7:
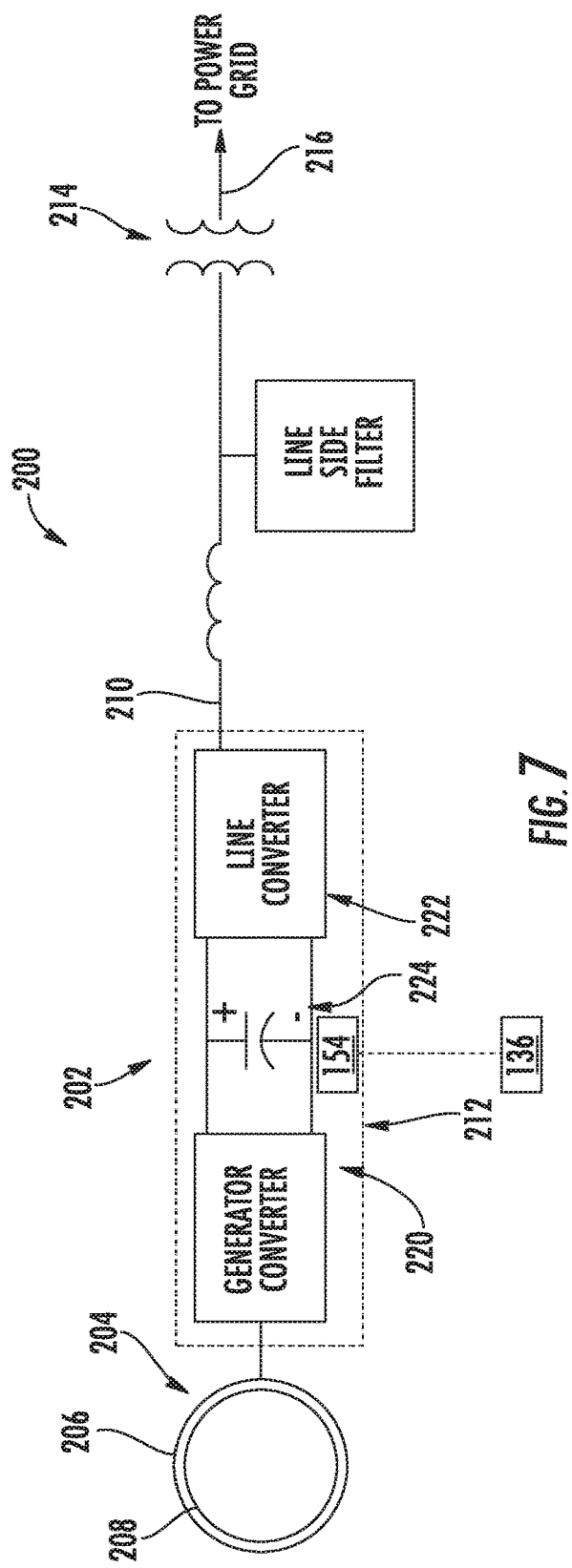
FIG. 7 illustrates a schematic diagram of another embodiment of an electrical power subsystem for use with a wind turbine according to the present disclosure.

Referring now to FIG. 7, another embodiment of an electrical power subsystem 202 for an electrical power system 200 is illustrated. In this embodiment, the subsystem 202 is a full conversion subsystem rather than a DFIG subsystem, with only a single generator power path 210 from the stator 206 of a generator 204 (which also includes a rotor 208) through a power converter 212 to a transformer 214. The transformer 214 in these embodiments is a two-winding transformer which electrically couples the generator power path 210 to an intermediate power path 216.

The power converter 212 may include a generator side converter 220, a line side converter 222, and a DC link 224. Switching elements (e.g. IGBTs) used in bridge circuits of the generator side converter 220 can be modulated to convert the AC power provided from the generator stator 206 into DC power suitable for the DC link 224. The line side converter 222 converts the DC power on the DC link 224 into AC output power suitable for the grid. In particular, switching elements (e.g. IGBTs) used in bridge circuits of the line side converter 222 can be modulated to convert the DC power on the DC link 224 into AC power. It should be understood that the generator side converter 220 and the line side converter 222 may have any configuration using any switching devices that facilitate operation of electrical power system 200 as described herein.

It should be understood that the turbine controller 136 and controller 154 as described herein may be utilized with any suitable electrical power systems, subsystems, and power converters thereof as discussed herein, such as any embodiments as discussed in FIGS. 2-7.

Figure 8:
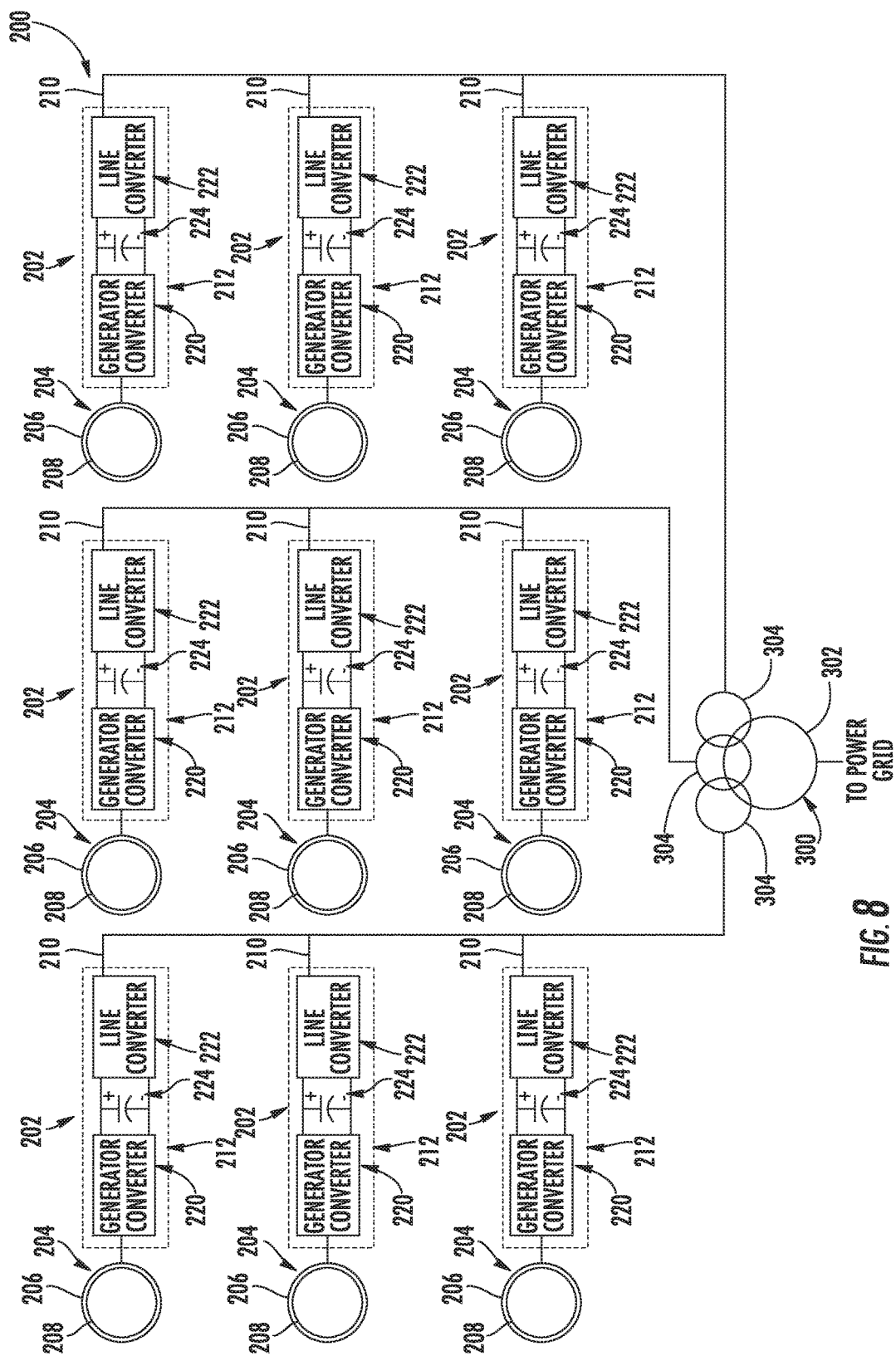
FIG. 8 illustrates a schematic diagram of another embodiment of an electrical power system according to the present disclosure, particularly illustrating a plurality of subsystems similar to those illustrated in FIG. 7.
Figure 9:
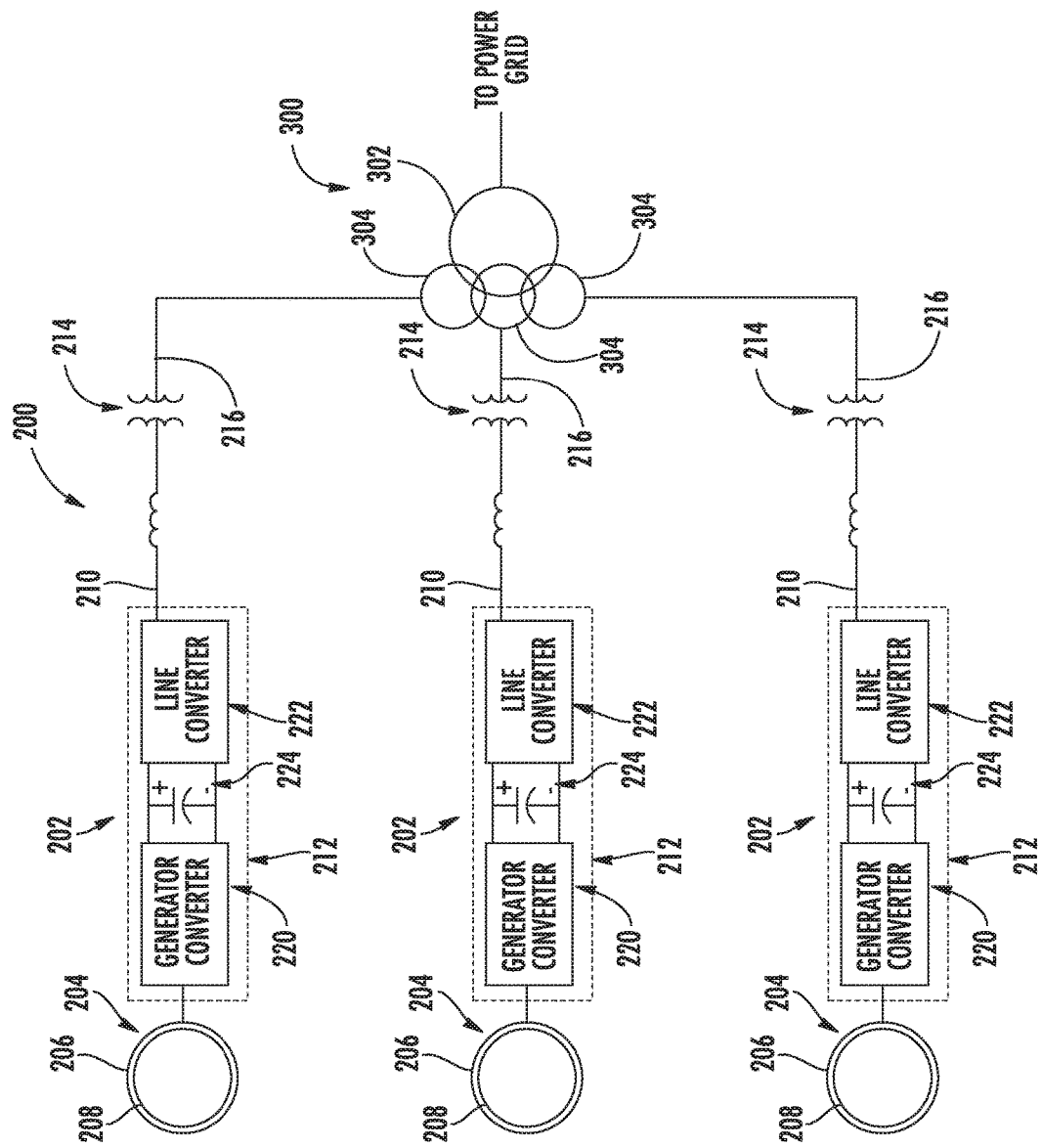
FIG. 9 illustrates a schematic diagram of another embodiment of an electrical power system according to the present disclosure, particularly illustrating a plurality of subsystems such as those illustrated in FIG. 7.

Referring now to FIGS. 8 and 9, individual power systems (such as the power subsystem 202 illustrated in FIG. 7) may be arranged in at least two clusters 237 to form an electrical power system 200. More specifically, as shown, the wind turbine power systems 200 may be arranged into a plurality of clusters 237 so as to form a wind farm. Further, each cluster 237 may be connected to a transformer 300 for stepping up the voltage amplitude of the electrical power from each cluster 237 such that the transformed electrical power may be further transmitted to the power grid, such as via a main line 248. An intermediate power path may electrically connect each cluster 237 to the transformer 300. In some embodiments, as illustrated in FIG. 9, the intermediate power path may be power path 216, as shown. In other embodiments, as illustrated in FIG. 8, no transformer 214 may be utilized, and the intermediate power path may be the generator power path 210. It should be understood that each cluster 237 may include one or more subsystems 102, with each intermediate power path 210, 216 electrically coupling one or more subsystems 102 to the transformer 300.

Referring now to FIGS. 10-13 as well as FIGS. 2-5 and 7-9, the transformer 300 in accordance with the present disclosure is advantageously a zig-zag transformer 300. As is generally understood, a zig-zag winding connection is a type of star-connection in which each output is the vector sum of any two phases. The zig-zag transformer 300 advantageously allows each cluster 48, 137, 237 of subsystems 27, 102, 202 within a system 46, 100, 200 to operate at a different phase shift, reducing or cancelling the harmonics produced by the subsystems 27, 102, 202 and associated wind turbines. Accordingly, the harmonic current transmitted to the power grid is reduced or eliminated. Zig-zag transformers are also cost-efficient and reliable, thus reducing the overall cost and increasing the reliability of the overall system.

Zig-zag transformer 300 includes a primary winding 302 and a plurality of secondary windings 304. The primary winding 302 is connected to the main line 50, 148, 248. Each secondary winding 304 is connected to an intermediate power path 60, 170, 210, 216.

As shown, at least one secondary winding 304 is a zig-zag winding having two winding portions, as is generally understood. For example, the plurality of secondary windings 304 may include one or more zig-zag windings and a wye winding, as shown, or another suitable combination of zig-zag, wye, and/or delta windings. In exemplary embodiments, the secondary windings 304 are phase-staggered, thus each having a different phase. Accordingly, the phase shift between the primary 302 and each secondary 304 is different and distinct from the phase shift between the primary 302 and each other secondary 304. Such arrangement advantageously allows harmonic currents produced by the various power converters of the various subsystems to be compensated for, thus reducing or eliminating such harmonic currents. In particular, a zig-zag transformer 300 in accordance with the present disclosure can be arranged to reduce or eliminate at least one or more of the $5^{th}$, $7^{th}$, $11^{th}$, $13^{th}$, $17^{th}$, $19^{th}$, etc. order harmonic.

Figure 10:
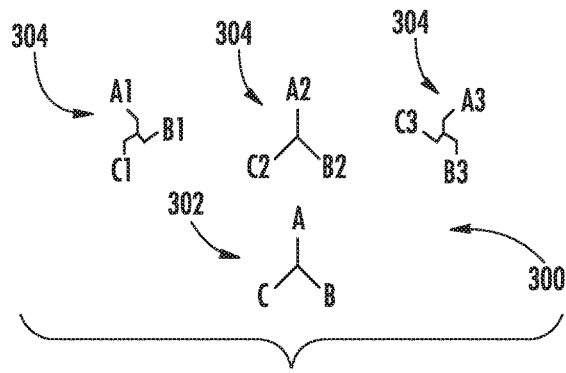
FIG. 10 illustrates a schematic diagram of the windings of a zig-zag transformer utilized in accordance with embodiments of the present disclosure.
Figure 11:
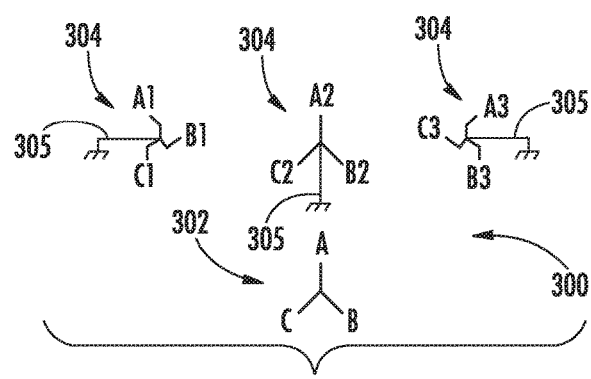
FIG. 11 illustrates a schematic diagram of the windings of a zig-zag transformer utilized in accordance with alternative embodiments of the present disclosure.
Figure 12:
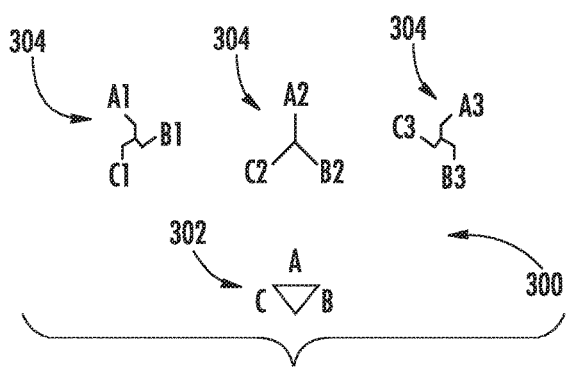
FIG. 12 illustrates a schematic diagram of the windings of a zig-zag transformer utilized in accordance with alternative embodiments of the present disclosure.

The primary winding 302 may, in some embodiments as illustrated in FIGS. 10 and 11, a wye winding. In other embodiments, as illustrated in FIGS. 12 and 13, the primary winding 302 is a delta winding.

Figure 13:
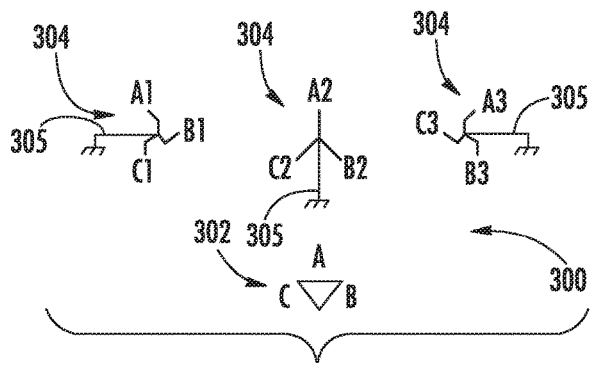
FIG. 13 illustrates a schematic diagram of the windings of a zig-zag transformer utilized in accordance with alternative embodiments of the present disclosure.

In some embodiments, as illustrated in FIGS. 11 and 13, each of the plurality of secondary windings 304 is independently grounded by a separate neutral 305 of such winding 304. Alternatively, as illustrated in FIGS. 10 and 12, no such independent grounding is necessary.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electrical power system connectable to a power grid, comprising:
    a plurality of electrical power subsystems, each of the plurality of electrical power subsystems comprising a power converter electrically coupled to a generator having a generator rotor and a generator stator, each of the plurality of electrical power subsystems configured to generate multiphase power;
    a plurality of intermediate power paths, each intermediate power path coupled to one or more of the plurality of electrical power subsystems, each intermediate power path configured to receive the multiphase power generated by the one or more of the plurality of electrical power subsystems coupled to the corresponding intermediate power path; and
    a zig-zag transformer electrically coupling each of the plurality of intermediate power paths to the power grid, the zig-zag transformer comprising a primary winding and a plurality of secondary windings, the primary winding electrically coupled to the power grid, each of the plurality of secondary windings connected to one of the plurality of intermediate power paths, and wherein at least one of the plurality of secondary windings is a zig-zag winding, and
    wherein the zig-zag transformer is configured to receive the multiphase power from the intermediate power path and supply the multiphase power to the power grid.

2. The electrical power system of claim 1, wherein the primary winding is a delta winding.

3. The electrical power system of claim 1, wherein the primary winding is a wye winding.

4. The electrical power system of claim 1, wherein each of the plurality of secondary windings is independently grounded.

5. The electrical power system of claim 1, wherein each of the plurality of electrical power subsystems defines a generator power path from the stator and the power converter for providing power to the power grid.

6. The electrical power system of claim 5, wherein the intermediate power path is the generator power path.

7. The electrical power system of claim 5, wherein each of the plurality of electrical power subsystems further comprises a transformer, the transformer electrically coupling the generator power path and intermediate power path.

8. The electrical power system of claim 1, wherein each of the plurality of electrical power subsystems defines a stator power path and a converter power path for providing power to the power grid, each of the plurality of electrical power subsystems further comprising a transformer.

9. The electrical power system of claim 8, wherein the transformer of each of the plurality of electrical power subsystems is a partial power transformer on the converter power path.

10. The electrical power system of claim 9, wherein a cluster of electrical power subsystems is coupled to each of the plurality of intermediate power paths.

11. The electrical power system of claim 8, wherein the transformer of each of the plurality of electrical power subsystem is a three-winding transformer between the stator power path, the converter power path, and the intermediate power path.

12. The electrical power system of claim 11, wherein a cluster of electrical power subsystems is coupled to each of the plurality of intermediate power paths.

13. An electrical power system connectable to a power grid, comprising:
    a plurality of electrical power subsystems, each of the plurality of electrical power subsystems comprising a power converter electrically coupled to a generator having a generator rotor and a generator stator, each of the plurality of electrical power subsystems defining a stator power path and a converter power path, each of the plurality of electrical power subsystems further comprising a transformer, each of the plurality of electrical power subsystems configured to generate multiphase power;
    a plurality of intermediate power paths, each intermediate power path coupled to one or more of the plurality of electrical power subsystems, each intermediate power path configured to receive the multiphase power generated by the one or more of the plurality of electrical power subsystems coupled to the corresponding intermediate power path; and
    a zig-zag transformer electrically coupling each of the plurality of intermediate power paths to the power grid, the zig-zag transformer comprising a primary winding and a plurality of secondary windings, the primary winding electrically coupled to the power grid, each of the plurality of secondary windings connected to one of the plurality of intermediate power paths, and wherein at least one of the plurality of secondary windings is a zig-zag winding, and
    wherein the zig-zag transformer is configured to receive the multiphase power from the intermediate power path and supply the multiphase power to the power grid.

14. The electrical power system of claim 13, wherein each of the plurality of secondary windings is independently grounded.

15. The electrical power system of claim 13, wherein the transformer of each of the plurality of electrical power subsystems is a partial power transformer on the converter power path.

16. The electrical power system of claim 13, wherein the transformer of each of the plurality of electrical power subsystem is a three-winding transformer between the stator power path, the converter power path, and the intermediate power path.

17. An electrical power system connectable to a power grid, comprising:
    a plurality of electrical power subsystems, each of the plurality of electrical power subsystems comprising a power converter electrically coupled to a generator having a generator rotor and a generator stator, each of the plurality of electrical power subsystems defining a stator power path and a converter power path, each of the plurality of electrical power subsystems further comprising a transformer, each of the plurality of electrical power subsystems configured to generate multiphase power;

a plurality of intermediate power paths, each intermediate power path coupled to one or more of the plurality of electrical power subsystems, each intermediate power path configured to receive the multiphase power generated by the one or more of the plurality of electrical power subsystems coupled to the corresponding intermediate power path; and a zig-zag transformer electrically coupling each of the plurality of intermediate power paths to the power grid, the zig-zag transformer comprising a primary winding and a plurality of secondary windings, the primary winding electrically coupled to the power grid, each of the plurality of secondary windings connected to one of the plurality of intermediate power paths, and wherein at least one of the plurality of secondary windings is a zig-zag winding, and wherein the zig-zag transformer is configured to receive the multiphase power from the intermediate power path and supply the multiphase power to the power grid.

18. The electrical power system of claim 17, wherein each of the plurality of secondary windings is independently grounded.

19. The electrical power system of claim 17, wherein the intermediate power path is the generator power path.

20. The electrical power system of claim 17, wherein each of the plurality of electrical power subsystems further comprises a transformer, the transformer electrically coupling the generator power path and intermediate power path.

* * * * *